Dec. 14, 1971     C. A. TALMON     3,626,750

LEAK DETECTION IN UNDERGROUND WATER SYSTEM

Filed Jan. 9, 1970     2 Sheets-Sheet 1

INVENTOR.
Clarence A. Talmon

BY

Paul + Paul

ATTORNEYS.

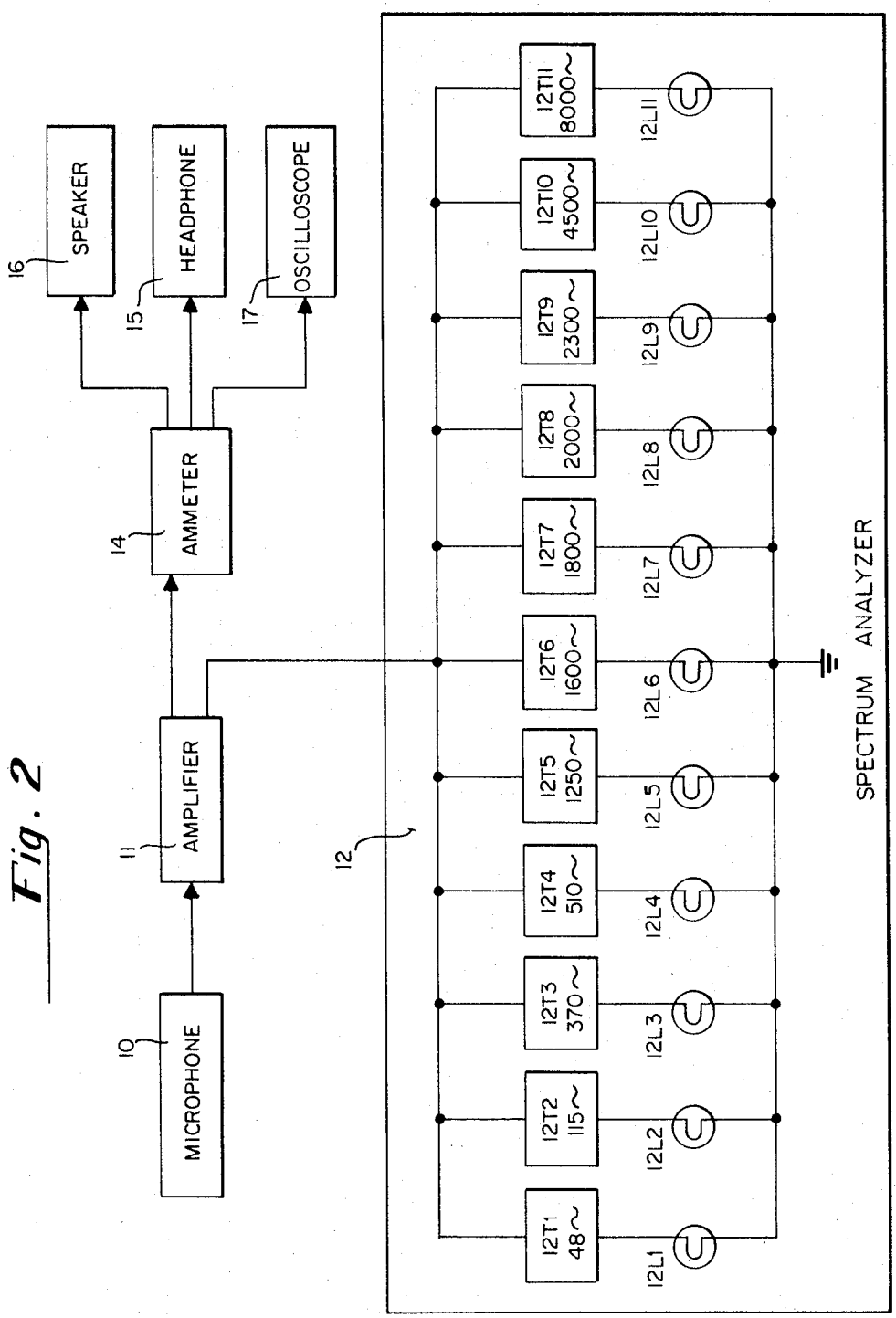

United States Patent Office 3,626,750
Patented Dec. 14, 1971

3,626,750
LEAK DETECTION IN UNDERGROUND WATER SYSTEM
Clarence A. Talmon, North Miami Beach, Fla. assignor to United States Water Conservation Corporation, Miami, Fla.
Filed Jan. 9, 1970, Ser. No. 1,783
Int. Cl. G01m 3/16, 3/24
U.S. Cl. 73—40.5 A                               3 Claims

ABSTRACT OF THE DISCLOSURE

A method for accurately locating leaks in underground water, gas, or like fluid, systems which includes the steps of detecting leak-frequency sound signals at a plurality of randomly selected locations on the underground system, converting the same to electrical signals, observing and selecting the predominant leak-frequency electrical signals and measuring the selected signals at a plurality of locations on the underground system, observing the two locations that yield electrical signals of greatest intensity at the selected leaf frequency, averaging the low-magnitude limit values of said signals of greatest intensity and ignoring the high-magnitude peak values, and determining the proportional relationship between said average low-magnitude values as a function of a reference value to determine the distance from the midpoint between the two locations to the leak location.

BACKGROUND OF THE INVENTION

Systems and methods have been proposed in the prior art for locating leaks in underground water, gas, or like fluid systems, as by listening for sound frequencies, converting the sound energy to electrical energy, amplifying the electrical energy, and using the amplified electrical energy to locate the approximate position of the leak. While the prior art systems have been capable of detecting the existence of an underground leak and of locating, to an approximation, the position of the leak, such prior art apparatus and methods have not been sufficiently accurate. As a result, paved streets have been excavated at points which are removed from the point where the leak is actually located. This, of course, is unsatisfactory since another or further excavation of the paved street or highway becomes necessary, at an increase in cost and time.

SUMMARY OF THE INVENTION

The primary object of the present invention is to provide a more accurate method of pin-pointing the location of leaks in underground water, gas, or similar fluid systems.

Another object is to provide an improved method of detecting and locating leaks in underground water, gas, or other fluid systems which is of such accuracy so as to avoid making excavations of streets and highways at locations which are removed from the actual location of the leak.

Another object is to provide a leak detection system which is sufficiently sensitive to detect and locate small-aperture leaks, as for example, leaks through holes as small as $3/64''$.

Another object is to provide an underground leak detection system which is so accurate as to locate a leak within 4 or 5 feet of the precise point of the leak.

The foregoing, as well as other objects and advantages of the present invention are achieved by a method which involves detecting sound signals of leak-indicating frequencies, converting the same to electrical signals, locating the approximate position of the leak as being between the two points of greatest signal intensity, averaging the low-amplitude limit values of the signals of greatest intensity while ignoring the high-amplitude peak values, determining the proportional relationship between the average values at the two points of greatest signal intensity as a function of a reference value, and calculating the distance to the leak from the mid-point between the two points.

BRIEF DESCRIPTION OF THE DRAWINGS

FIG. 2 is a block diagram of apparatus suitable for carrying out the method of the present invention.

DESCRIPTION OF THE PREFERRED EMBODIMENT

Figure 1:
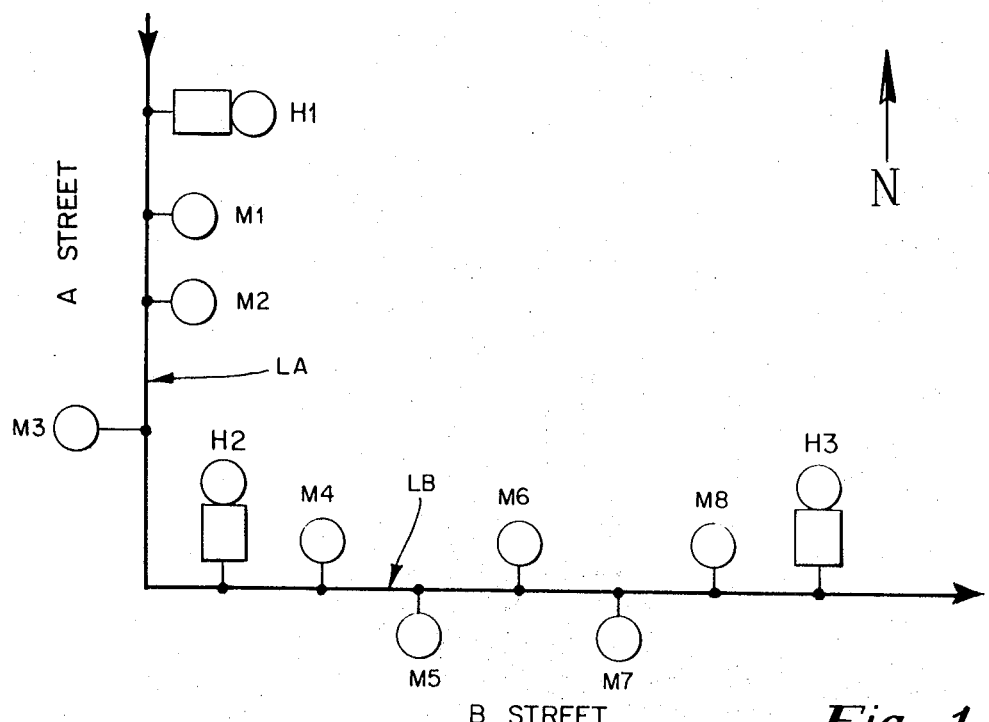
FIG. 1 is a schematic diagram of a portion of an illustrative underground water system.

The schematic diagram shown in FIG. 1 illustrates a small portion of a much larger underground water system. A water line is shown running south on A Street and turning east on B Street. The line on A Street is identified as LA to distinguish it from the line on B Street which is LB. Three hydrants H1, H2 and H3 are shown, one of which is connected to line LA and two to line LB. Eight house meters M1 through M8 are indicated. These may be assumed to be installed on the exterior rear or side walls of homes along A and B Streets.

It is a recognized fact that hundreds of thousands of gallons of water are lost annually through undetected leaks in underground pipes of publicly and privately-owned water systems. It would obviously be advantageous for the owners or operators of a water system to have regular routine inspections to determine the existence and location of water leaks, so as to be able to make the necessary repairs to avoid loss of valuable water.

To facilitate an explanation of the methods employed according to the present invention, assume that a routine maintenance inspection is to be made and that the investigator is equipped with apparatus of the type indicated in block diagram in FIG. 2. This apparatus may conveniently be installed in a small truck or other mobile vehicle. To detect any leaks in that portion of the underground water system illustrated in FIG. 1, the maintenance operator would, for example, place a microphone in good contact with hydrant H2 to detect any sound-frequency signals in the range of interest, which extends from about 48 cycles per second (c.p.s.) to about 8,000 c.p.s. The sound-frequency signals picked up at hydrant H2 by the microphone are converted by the microphone to electrical signals and are amplified in amplifier 11. At this stage of the investigation, amplifier 11 is tuned broadly to cover the entire range of frequencies, 48 to 8,000 c.p.s. The amplified signals from amplifier 11 are applied to a spectrum analyzer 12 which may, for example, consist of a bank of eleven sharply-tuned circuits 12T1 to 12T11, inclusive, each tuned to a different frequency, and each supplying a different light bulb or lamp 12L1 to 12L11, respectively. The tuned circuits 12T1 to 12T11 may, for example, be tuned respectively to 48, 115, 370, 510, 1250, 1600, 1800, 2000, 2300, 4500 and 8000 c.p.s.

The operator observes which one of the lamps 12L1–12L11 is brightest. In some instances, two or more lamps may appear equally, or almost equally bright. This is noted by the operator, and may be an indication of more than one leak. For the purpose of this description assume that one lamp is much brighter than the others. If the brightest lamp is one supplied by a circuit tuned to 370° c.p.s., or to 510 c.p.s., these indications may be ignored since these frequencies are ordinarily associated with sounds generated by water flowing through a meter. In other words, signals picked up at these two frequencies are indications of water being drawn by a consumer, and not indications of a water leak.

To reduce, as much as possible, the picking up of unwanted signals, including signals generated by customer water consumption, the preliminary steps in the maintenance inspection to detect leaks may desirably be carried out in the dead of night. That is to say, the detection of leaks by placing a microphone on a hydrant, or on a pointed rod driven down to the underground pipe itself, may be made in the dead of night without arousing public objection. However, the final steps of pin-pointing the location of the leak may require placing microphones on water meters located on the side walls or rear walls of homes, and this work is better done in the daytime rather than in the middle of the night.

To return to the description of the method of locating a water leak, the maintenance operator by observing the brilliance, or lack of brilliance, of the various lamps 12L1–12L11 of the spectrum analyser 12, decides whether any leak signals are present. For example, if any one of the lamps 12L5, 12L6 and 12L7 which are fed by circuits 12T5, 12T6 and 12T7 tuned respectively to the frequencies 1250, 1600, or 1800 c.p.s., are brightly illuminated, this is usually an indication of a water leak , since these frequencies are generated by water escaping through holes in the pipe.

Assume for purposes of this description that the lamp 12L7 supplied with 1800 c.p.s. signals through the 1800 c.p.s. tuned circuit 12T7 is brilliantly illuminated. To examine more closely the 1800 c.p.s. signal, the operator would tune amplifier 11 to 1800 c.p.s., and he would observe the current at this frequency on the ammeter 14. He would also listen to the 1800 c.p.s. signals, either on the headset 15 or speaker 16, and he would watch the current waveform on the oscilloscope 17.

Having confirmed the presence and studied the strength of signals at 1800 c.p.s., thereby confirming the strong likelihood of a leak, the operator would next try to locate the leak and to pin-point its exact position. To do this, the operator would go to hydrants H1 and H3, one on either side of hydrant H2, and, using the equipment of FIG. 2 in the manner indicated above, the operator would measure and observe the relative strengths of the 1800 c.p.s. frequency signals at H1 and H3. Assume that the signals detected at hydrant H3 are substantially greater than at hydrant H1. This would indicate that the leak is between H2 and H3, and not between H1 and H2.

Having determined that the leak is between H2 and H3, the operator would next proceed to measure the 1800 c.p.s. signals at the various house water meters M4, M5, M6, M7 and M8 which are connected to the line LB between hydrants H2 and H3. Assume that the two strongest signals are detected at water meters M6 and M7. This indicates that the leak is between water meters M6 and M7.

The next problem is to pin-point the leak location, so as to avoid more than one excavation, especially where the excavation involves a paved street or highway. To pin-point the leak location, the operator proceeds as follows: He carefully observes the needle fluctuations of the current meter 14. It is understood, of course, that this meter 14 is being supplied by signals from microphone 10 at water meter M6 and that these current signals are amplified in amplifier 11 which is now tuned to 1800 c.p.s. Representative fluctuations of the current meter needle are illustrated graphically in FIG. 3. It is believed that these fluctuations in the amplitude of the 1800 c.p.s. signals are due to variations which occur in the power level of the background noise. The background noise ordinarily includes frequencies which are within the band-pass of the tuned circuit, which in the present case is 12T7 tuned to 1800 c.p.s., and these background noise signals added to and raise the level of the signal applied to the ammeter 14 whose fluctuations are being observed by the operator. Since the noise level varies in power magnitude, whereas the level of the leak signals remains fairly constant, it is suggested that a more accurate calculation of the exact position of the water leak could be made by using the low-magnitude values of the current fluctuations, to the exclusion of the high-magnitude or peak values. Accordingly, the operator is instructed to pay attention only to the low swings of the needle of current meter 14.

Figure 3:
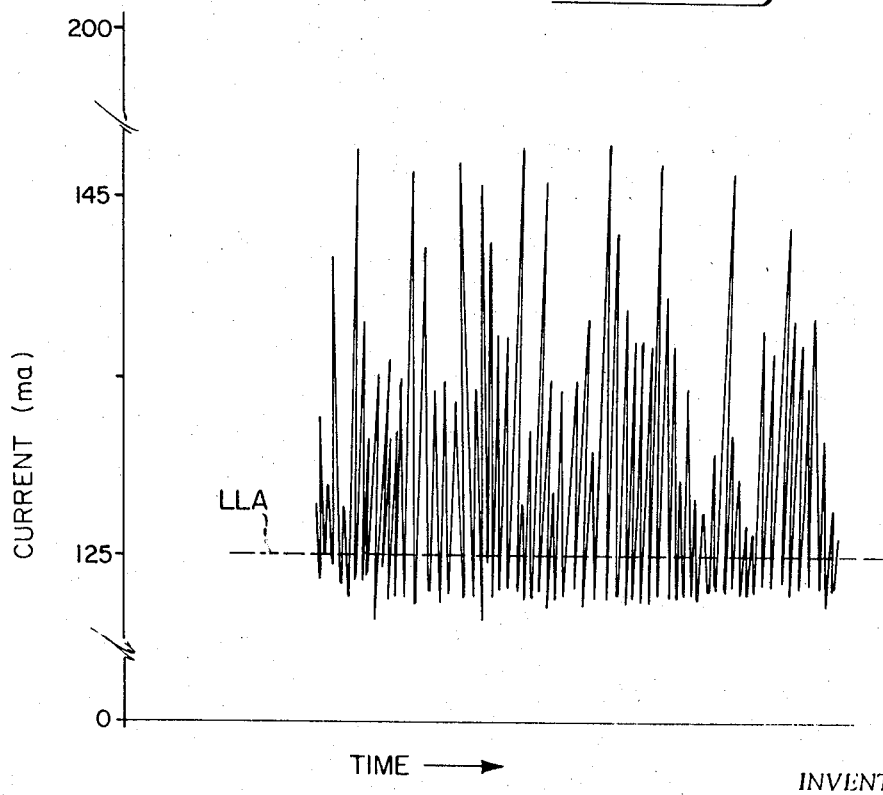
FIG. 3 is an illustrative graph of current values used in determining the position of the leak according to the method of the present invention.

Assuming now that the current variations at 1800 c.p.s. are plotted and are as seen graphically in FIG. 3, the next step is to take an average of the low limit values. This low limit average is represented in FIG. 3 by the dashed line LLA.

Assume, for the purposes of this discussion, that the low-limit average values (LLA) observed on current meter 14 is 125 milliamperes (ma.) and that this reading is taken at water meter M6. The operator next goes to water meter M7 and takes similar readings. Assume that the low-limit average current values (LLA) observed at water meter M7 is 150 ma.

Readings having been taken as indicated above, an accurate calculation of the position of the water leak can now be made, using the following formula:

$$S = \frac{D}{2} + \left[ \left[ \frac{LLA(1)}{FS} - \frac{LLA(2)}{FS} \right] \times D \right]$$

where:
S=distance (in feet) to leak from water meter having the lesser current reading.
D=distance (in feet) between the water meters.
LLA(1)=low limit average current at the measuring point (water meter M7) having the greater reading.
LLA(2)=low limit average current at the measuring point (water meter M6) having the lesser reading.
FS=the full scale value of the current meter.

The quantity calculated by the above formula represents the distance (in feet) from the water meter having the lesser current reading to the leak as measured along the pipe toward the water meter having the greater current reading.

Assume, for example, that the distance D from water meter M6 to water meter M7 is 60 feet. Assume that the full scale deflection of current meter 14 is 200 milliamperes (ma.). The readings at water meters M6 and M7 are assumed, in this illustration, to be 125 ma. and 150 m., respectively. Applying these values to the above formula, we get:

$$S = \frac{60}{2} + \left[ \left[ \frac{150}{200} - \frac{125}{200} \right] \times 60 \right]$$

or 30+7.5=37.5 feet.

By the foregoing formula, the operator has calculated that the leak is 37.5 feet from the water meter M6 along the water pipe toward water meter M7. In making these calculations, the distance from each water meter to the main transmission pipe LB should be included in making the measurement of the total distance D from one meter to the other.

It is to be noted that an important factor in the foregoing formula is the full scale deflection FS of the current meter 14. This is the reference value to which the two readings at M6 and M7 are proportionally related. In a given instance, if the 200-ma. full scale deflection meter were to be replaced with a 300-ma. meter, the meter readings assumed above in the present example (125 ma. and 150 ma.) would no longer be obtained. Instead, the meter would, for example, read 135 ma. and 172.5 ma. on the 300-ma. meter, when used in the formula given above, would produce the same result as produced by the readings of 125 ma. and 150 ma. on the 200-ma meter. This is readily shown by the following:

$$S = \frac{60}{2} + \left[\left[\frac{172.5}{300} - \frac{135}{300}\right] \times 60\right]$$

$$S = 30 + \left[\frac{37.5}{300} \times 60\right]$$

$$S = 30 + 7.5 = 37.5 \text{ feet}$$

It is to be understood that where, as postulated above, a 300-ma. meter replaces a 200-ma. meter, the gain of amplifier 11 (FIG. 2) is turned up by the operator so that the maximum needle deflections on the meter, such as are illustrated in FIG. 3, have the same relationship to full-scale deflection on the 300-ma. meter as they did on the 200-ma. meter. As a result, the low-limit average reading on the 300-ma meter will be greater than on the 200-ma. meter.

In making the current measurements, the operator must be careful to make good electrical contact at the fire hydrant, or at the water meter, or some other point on the water system. It is also important that the contacts at the various points, for example, at the water meters, be similar, so as to avoid introducing variations in current readings not related to the distance to the water leak. There should also be relativity of contact. That is to say, current readings at a fire hydrant should be compared only with readings at another fire hydrant; gate valve readings should be compared only with gate valve readings; house meter readings should be compared only with house meter readings.

In the schematic showing in FIG. 1, only fire hydrants and house water meters have been indicated, but there are, of course, various other water-system components which allow making contact with the water system. Included among these are gate valves (which may be either in a manhole or in a buffalo box), curb boxes or curb stops, etc. Also, of course, pin rods are used to make contact with the transmission pipe itself. Where readings are taken by placing the microphone on a pin rod, the pin rod should be pin-point sharp so as to avoid slippage of the rod on the pipe.

In FIG. 2, an oscilloscope 17 has been indicated. This device is particularly useful in the early stages of the inspection where the operator is trying to determine whether there are any leaks in this area, and where the noise level is high and the leak signals tend to be masked out. By observing the signals carefully on the scope 17, the leak frequency signal may be picked out, and the amplifier 11 thereupon tuned to the selected leak frequency.

Water escaping through holes or openings in the pipe generate different sound frequencies according to the type of hole, type of ground, and other factors. For example, if the water is escaping through a hole having an escaloped edge, a higher sound frequency will be generated than if the edge of the escape hole is smooth. Also, if the water is escaping into rock or stony ground, the sounds generated will be of higher frequency than if the water if escaping into sand or mud.

The method disclosed in the present application may be used, not only to detect and locate escaping water, but also to detect and locate unwanted water infiltration, e.g. water entering into a sewer or other pipe. The method may also be used in gas transmission system, but here the sound frequencies involved would be appreciably higher.

What is claimed is:
1. A method of locating leaks in underground water, gas, or other fluid, systems, comprising the steps of:
   (a) detecting at a plurality of randomly selected points on the system a plurality of sound signals, including signals at frequencies identifiable with fluid leaks;
   (b) converting the sound signals to electrical signals;
   (c) observing and selecting from among the plurality of leak-frequency electrical signals the one which predominates in intensity;
   (d) measuring said selected leak frequency signal at a plurality of different locations on the system;
   (e) selecting from said plurality of locations the two locations that yield said selected leak-frequency signals of greatest intensity;
   (f) averaging the low-limit amplitudes of said measured signals at each of said two locations and ignoring the high-limit amplitude values;
   (g) determining the proportional relationship between said average low-limit values at said two locations as a function of the full scale value of the signal-measuring instrument, and
   (h) utilizing said proportional relationship to determine the location of the fluid leak relative to said two locations.

2. The method according to claim 1 characterized in that the steps of detecting a plurality of sound signals at a plurality of locations includes concurrent visual detection on an oscilloscope at a plurality of electrical frequencies corresponding to said plurality of sound signals.

3. The method according to claim 1 characterized in that the step of utilizing the proportional relationship between the average low-limit values at the two locations of greatest intensity relative to the full scale value of the signal measuring instrument to determine the location of the fluid leak includes use of the equation, $$S = \frac{D}{2} \left[\left[\frac{LLA(1)}{FS} - \frac{LLA(2)}{FS}\right] \times D\right]$$

where:
D = distance (in feet) between the two measuring points (1) and (2) yielding the signals of greatest intensity.
LLA(1) = low-limit average current at point (1) having the greater intensity of the two.
LLA(2) = low-limit average current at point (2) having the lesser intensity of the two.
FS = full scale value of current-measuring instrument.
S = distance (in feet) to leak from measuring point having the lesser intensity of the two.

References Cited
UNITED STATES PATENTS

| | | | |
|---|---|---|---|
| 267,825 | 11/1882 | Bell | 181—0.5 |
| 3,028,450 | 4/1962 | Manning | 181—0.5 X |
| 3,223,194 | 12/1965 | Michael | 181—0.5 |

RICHARD C. QUEISSER, Primary Examiner

J. P. BEAUCHAMP, Assistant Examiner